United States Patent [19]

Drefahl

[11] Patent Number: 4,783,621
[45] Date of Patent: Nov. 8, 1988

[54] APPARATUS FOR EVALUATING THE DISTANCE OF AN OBJECT

[75] Inventor: Dieter Drefahl, Hanau, Fed. Rep. of Germany

[73] Assignee: Honeywell GmbH, Regelsysteme, Fed. Rep. of Germany

[21] Appl. No.: 32,669

[22] Filed: Apr. 1, 1987

[30] Foreign Application Priority Data

May 2, 1986 [DE] Fed. Rep. of Germany ....... 3614850

[51] Int. Cl.$^4$ .............................................. G01S 13/46
[52] U.S. Cl. .................... 324/60 CD; 307/234; 324/60 C; 367/99; 367/118
[58] Field of Search ............ 324/60 R, 60 CD, 60 C, 324/58 B, 58.5 B, 532, 533, 534, 535, 178, 180, 61 R; 320/1; 364/561; 307/234, 264, 601, 602; 367/99, 118, 127, 121, 122, 123; 342/118

[56] References Cited

U.S. PATENT DOCUMENTS

| | | | |
|---|---|---|---|
| 3,685,909 | 8/1972 | Schwartz | 324/178 X |
| 4,380,764 | 4/1983 | Connors | 324/60 CD X |
| 4,527,113 | 7/1985 | Hillerich | 324/534 X |

*Primary Examiner*—Reinhard J. Eisenzopf
*Assistant Examiner*—Robert W. Mueller
*Attorney, Agent, or Firm*—Mitchell J. Halista; Albin Medved

[57] ABSTRACT

An apparatus for detecting the distance of an object from a signal transmitter during radiation of a transmitter signal uses a first capacitor which is initially short-circuited by means of a first switch and subsequently is charged from a constant current source following an opening of the switch. Upon a reception of an echo signal, the charge of the first capacitor is transferred to a second capacitor by closing a second switch at the time of the echo signal reception. The charge on the second capacitor, which is proportional to the elapsed time between transmitted and received signals, is delivered to an output via a low pass filter with the output signal representing a distance measuring signal.

7 Claims, 2 Drawing Sheets

F I G. 3a
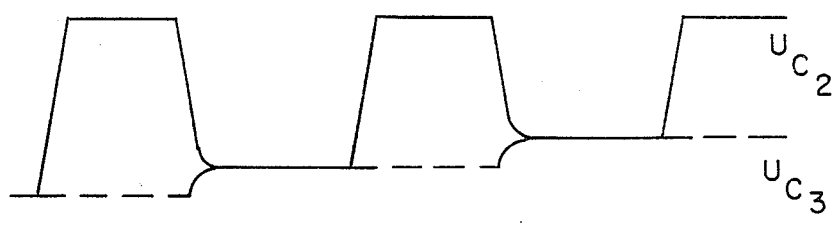
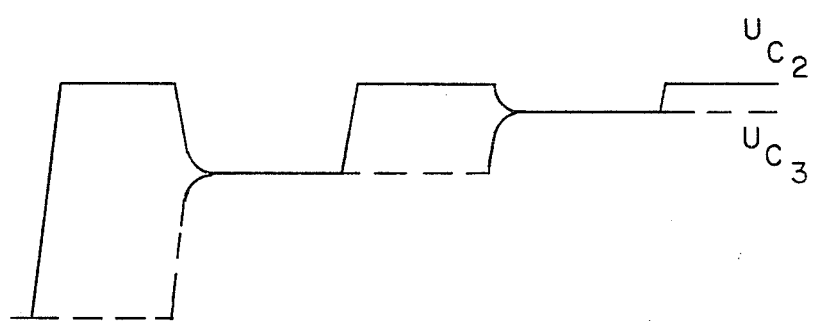
F I G. 3b

APPARATUS FOR EVALUATING THE DISTANCE OF AN OBJECT

BACKGROUND OF THE INVENTION

1. Field of the Invention

The present invention relates to an apparatus for measuring the distance of an object from the apparatus.

2. Description of the Prior Art

A prior art distance measuring device uses a periodically dischargeable capacitor which is charged from a voltage source, and the charge level which has been stored between transmission of a pulse and reception of an echo pulse is used for distance evaluation after transferring the charge to a further capacitor. In that device multiple echoes and excessive deviations of the measured values produce an indicated distance value which only slowly converges to the actual value.

SUMMARY OF THE INVENTION

It is an object of the present invention to provide an improved distance measuring apparatus in which the output signal accurately represents the measured distance values particularly in the event where the measured distance values show excessive deviations.

In accomplishing this and other objects, there has been provided, in accordance with the present invention, an apparatus for evaluating the distance of an object from a transmitter/receiver by transmitting a signal and measuring the elapsed time until reception of the reflected signal, whereby the elapsed time is proportional to the distance comprising a first capacitor chargeable from a source with the stored charge difference between signal transmission and reception being a measure for the distance, a constant current source for charging the first capacitor, a first switch for discharging the capacitor in predetermined time intervals, a second capacitor, and a second switch for transferring the charge of the first capacitor to the second capacitor by connecting the second capacitor in parallel to the first capacitor with the second capacitor forming part of a low pass filter.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

The apparatus according to the invention is characterized by the exchange of a stored charge according to the measured values between at least two capacitors, whereat the second capacitor forms a portion of a low pass filter circuit. According to a preferred embodiment, the resistance of the low pass filter is provided by a voltage-dependent resistor which has a high resistance value for low voltages and a small value for high voltages. This results in the advantage that large changes of the measured value are forwarded by the filter circuit, whereas noise signals of low amplitude are smoothed by the filter. By the use of an intermediate capacitor and suitable actuation of interconnecting switches, a capability to evaluate only certain echos is effected.

Figure 1:
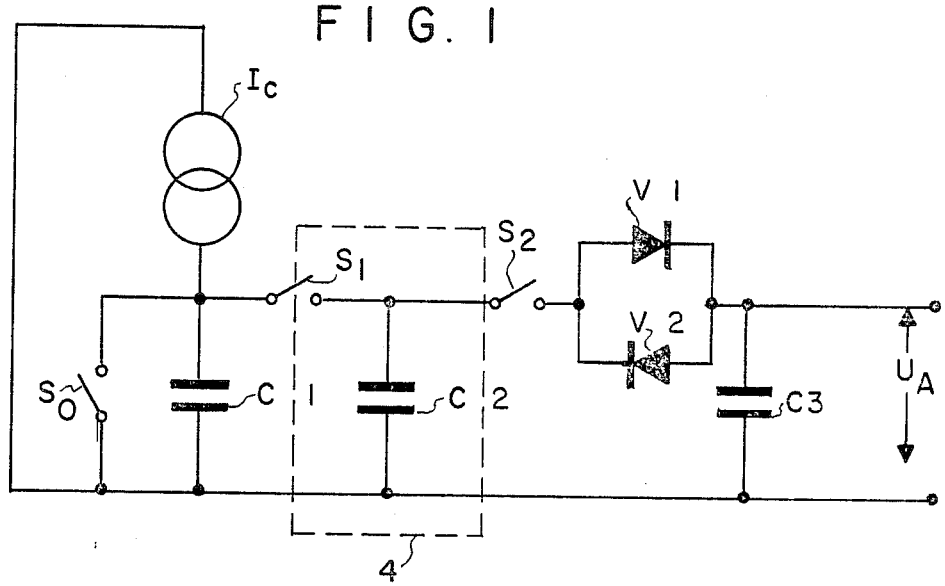
FIG. 1 is a schematic illustration of an example of an embodiment of the present invention.
Figure 2A:
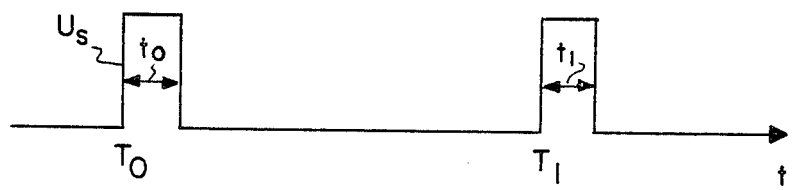
FIGS. 2a, 2b and 2c are waveshape diagrams for explaining the operation of a first portion of the circuit shown in FIG. 1 and FIGS. 3a and 3b are waveshape diagrams for explaining the operation of a second portion of the circuit shown in FIG. 1.

According to the FIGS. 1 and 2a at a point of time $T_0$ during the duration $t_0$ of the radiation of a transmitter pulse or a group of transmitter pulses $U_s$, respectively, from a transmitter/receiver/(not shown); a first capacitor C1 is short-circuited by means of a first switch S0 connected in parallel to the capacitor C1 so that its voltage is reset to "0" volts. Subsequently, the switch S0 is opened, and, therefore, the short circuit of capacitor C1 is suspended. A constant current source Ic connected to the capacitor C1 subsequently charges this capacitor C1 with a voltage linearly increasing with time as shown in FIG. 2c.

Figure 2B:
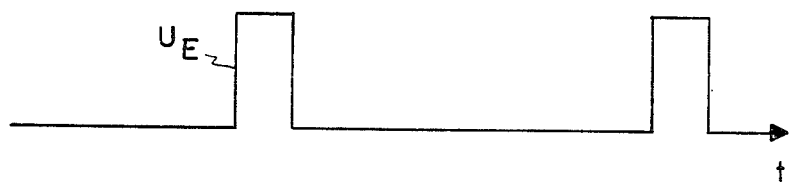
Figure 2C:
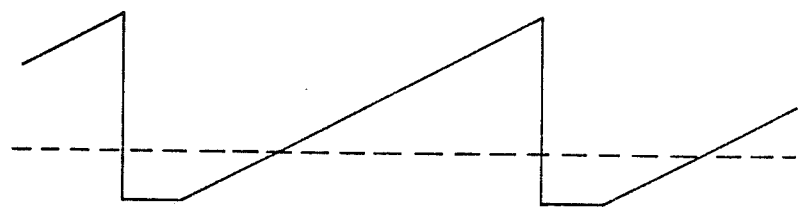

Following the reception of an echo signal $U_E$, by the aforesaid transmitter/receiver; according to FIG. 2b, a second switch S1 arranged between the first capacitor C1 and a second capacitor C2 is closed during the reception time. It may be assumed that the second capacitor C2 has a charging voltage V2a from the preceding measurement and that under the further assumption that a negligible resistance exists between capacitors C1 and C2 whereby an immediate charge equalization takes place therebetween. With both capacitors C1, C2 having respective capacitances C1 and C2, at the end of the received echo the following voltage results on both capacitors C1, C2:

$$V1 = V2 \frac{C1 \cdot V1 + C2 + V2a}{C1 + C2}$$

In this way a first order exponential smoothing between sequential measurements is provided, whereby the smoothing coefficient is given by the selection of the capacitances C1 and C2 of both capacitors C1, C2. If undesired smoothing, i.e., smoothing of large deviations of the measured value is to be prevented, then preferably the first capacitor C1 has to be chosen with a much larger capacitance than the capacitance of the second capacitor C2.

After the first reception cycle has been finished, the transmitter signal again is generated at the point of time T1 during the time interval t1. During this time interval, a third switch S2 arranged between the second capacitor C2 and a third capacitor C3 is closed. It may be assumed that the third capacitor C3 has a charging voltage V3a from the preceding measuring cycle so that with a negligible resistance between capacitors C2 and C3 a charge equalization may take place according to the following equation:

$$V3 = V2 = \frac{C2 \cdot V2 + C3 \cdot V3a}{C2 + C3}$$

The third capacitor C3 forms part of a low pass filter. This results in the advantage that noise signals with a high frequency are filtered out. However, at the same time large deviations of the measured value are filtered out, and the output voltage $U_A$ converges only slowly to the measured value as may be taken from FIG. 3a, where the full line shows the voltage on the capacitor C2, and the dotted line shows the output voltage on the capacitor C3. With this simple exponential smoothing, the output voltage only slowly converges to the actual measured value.

If, however, instead of an ohmic resistor a voltage-dependent resistor element is arranged between the second capacitor C2 and the third switch S2 and the third capacitor C3 with its resistance decreasing for increasing voltages, then during the closing time of the third switch S2 a full charge equalization is only possible for small resistance values. According to the definition, the resistance is only small if $|V3a - \overline{V2}|$ has a large value, i.e., that at large deviations of the measured value a quick equalization of the voltage takes place. This is shown in FIG. 3b where again the full line shows the voltage on the second capacitor C2 and the dotted line shows the output voltage on the third capacitor C3. It may be noted that by this adaptive exponential smoothing the output voltage converges very quickly to the voltage of the measured value. If the difference voltage $|V3a - \overline{V2}|$ decreases during the voltage equalization or the voltage difference is small from the beginning as it may be the case with noise signals, then as a result of the high resistance value of the low pass filter only an incomplete charge equalization may take place during the closing time of the third switch S2 according to the following equation:

$$\overline{V3} = \overline{V3a} + \alpha \cdot (\overline{V2} - V3a) \text{ with } 0 < \alpha < 1$$

For the voltage-dependent resistor, two diodes V1, V2 connected in parallel and oppositely poled with respect to each other with their resistance sharply increasing at a voltage below 0.7 volt can be used to produce a quick step response of the output signal for deviations of the measured value above 0.7 volt; for deviations of the measured value below 0.7 volt, however, a strong exponential smoothing results.

The circuit according to FIG. 1 is operable without the intermediate circuit 4 shown within the dotted line. In this arrangement, the first capacitor C1 by means of the third switch S2 is connected directly to the low pass filter D1, D2, C3 in order to produce an output voltage $U_A$ which is proportional to the distance by actuating the third switch S2 at the reception of an echo. By providing the intermediate second capacitor C2 and the additional second switch S1, however, a capability results to evaluate only certain echos. If still further echoes besides the first echo exist between the transmission of two transmitter signals, then the second switch S1 may be controlled by a counter which only switches each "n" echo. In this manner extreme values, e.g., the first and the last echo, may be evaluated in a simple manner. In the first case, the second switch S1 after being closed at the reception of the first echo remains opened for the total remaining reception time. In the second case, the second switch S1 is closed for each received echo. Then at the end of the reception time the following voltage results on the second capacitor C2:

$$V2 = \frac{C1 \cdot V1n + C2 \cdot V2a}{C1 + C2}$$

In this equation V1n represents the voltage on the capacitor C1 charged by the constant current source Ic during the "n" echo. The voltage V2 resulting on the capacitor C2 at the end of the reception time then may be outputted as output voltage $U_A$ via the adaptive low pass filter D1, D2, C3 by closing the third switch S2 at the transmission of the next transmitter signal.

Accordingly, it may be seen that there has been provided, in accordance with the present invention, an improved distance measuring apparatus.

The embodiments of the present invention in which an exclusive property or privilege is claimed are defined as follows:

1. An apparatus for evaluating the distance of an object from a transmitter/receiver by transmitting a signal to the object and measuring the elapsed time until reception of a reflected signal from the object, whereby the elasped time is proportional to the distance to the object comprising
    a constant current source,
    a first capacitor chargeable from said source with the charge stored between the signal transmission and reception being a measure of the distance to the object from the transmitter/receiver,
    a first switch for discharging said capacitor in predetermined time intervals,
    a second capacitor, and
    a second switch for transferring the stored charge of said first capacitor to said second capacitor by connecting said second capacitor in parallel to said first capacitor, said second capacitor forming part of a low pass filter having a resistance dependent on the applied voltage.

2. An apparatus according to claim 1 wherein said low pass filter includes a pair of diodes connected in parallel and poled oppositely with respect to each other.

3. An apparatus according to claim 1 wherein said first switch is closed during the generation of the transmitter signal and said first capacitor afterwards is charged from said constant current source.

4. An apparatus for evaluating the distance of an object from a transmitter/receiver by transmitting a signal to the object and measuring the elasped time until reception of a reflected signal from the objects, whereby the elapsed time is proportional to the distance to the object comprising
    a constant current source,
    a first capacitor chargeable from said source with a charge stored between the signal transmission and reception being a measure of the distance to the object from the transmitter/receiver.
    a first switch for discharging said capacitor in predetermined time intervals,
    a second capacitor,
    a second switch for transferring the stored charge of said first capacitor to said second capacitor by connecting said second capacitor in parallel to said first capacitor,
    a third switch,
    a voltage-dependent resistor means, and
    a third capacitor connected in parallel to said second capacitor via said third switch and said voltage-dependent resistor means, where said second switch is closed at reception of the reflected signal and said third switch is closed at the time of a succeeding transmitter transmitted signal.

5. An apparatus according to claim 4 wherein the value of said third capacitor is larger than the value of said second capacitor and the value of said second capacitor is larger than the value of said first capacitor.

6. An apparatus according to claim 4 wherein said first switch is closed during the generation of the transmitter signal and said capacitor afterwards is charged from said constant current source.

7. An apparatus according to claim 4 wherein said voltage-dependent resistor includes a pair of diodes connected in parallel and poled oppositely with respect to each other.

* * * * *